United States Patent
Raeis Hosseiny et al.

(10) Patent No.: US 11,358,639 B2
(45) Date of Patent: Jun. 14, 2022

(54) TRAILER HITCHING ASSISTANCE SYSTEM WITH CONTACT MITIGATION MEASURES

(71) Applicant: Ford Global Technologies, LLC, Dearborn, MI (US)

(72) Inventors: Seyed Armin Raeis Hosseiny, Canton, MI (US); Luke Niewiadomski, Dearborn, MI (US); Roger Arnold Trombley, Ann Arbor, MI (US); Donald Jacob Mattern, Canton, MI (US); Craig Schmatz, Birmingham, MI (US); Li Xu, Northville, MI (US); Arnav Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 16/815,080

(22) Filed: Mar. 11, 2020

(65) Prior Publication Data
US 2021/0284238 A1  Sep. 16, 2021

(51) Int. Cl.
*B60R 1/00* (2022.01)
*B60D 1/36* (2006.01)
*B62D 15/00* (2006.01)
*G06T 11/00* (2006.01)
*G06F 17/00* (2019.01)
*B62D 15/02* (2006.01)

(52) U.S. Cl.
CPC ....... *B62D 15/0275* (2013.01); *B62D 15/025* (2013.01)

(58) Field of Classification Search
None
See application file for complete search history.

(56) References Cited

U.S. PATENT DOCUMENTS

| | | | |
|---|---|---|---|
| 7,237,790 | B2 | 7/2007 | Gehring et al. |
| 8,038,166 | B1 | 10/2011 | Piesinger |
| 9,082,315 | B2 | 7/2015 | Lin et al. |
| 9,434,381 | B2 | 9/2016 | Windeler |
| 9,457,632 | B1 | 10/2016 | Windeler et al. |
| 9,499,018 | B2 | 11/2016 | Gehrke et al. |

(Continued)

FOREIGN PATENT DOCUMENTS

| | | |
|---|---|---|
| CN | 106250893 A | 12/2016 |
| DE | 102015213404 A1 | 7/2015 |
| GB | 2469438 B | 4/2014 |

*Primary Examiner* — Adam D Tissot
(74) *Attorney, Agent, or Firm* — Raymond Coppiellie; Price Heneveld LLP

(57) ABSTRACT

A system for assisting in aligning a vehicle for hitching with a trailer includes a controller that receives the scene data and identifying the trailer within the area to the rear of the vehicle, derives a backing path to align a hitch ball mounted on the vehicle to a coupler of the trailer, outputting a powertrain control signal to the vehicle powertrain control system, and a brake control signal to the vehicle brake system to maneuver the vehicle, including reversing along the backing path and stopping the vehicle at an endpoint of the path, and outputs a video image to the vehicle human-machine interface including a graphical overlay on the image data. The graphical overlay indicates potential movement of the hitch ball past the coupler and being positioned in the image data between a bumper of the vehicle and the hitch ball.

20 Claims, 9 Drawing Sheets

(56) References Cited

U.S. PATENT DOCUMENTS

| | | |
|---|---|---|
| 9,731,568 B2 | 8/2017 | Wuergler et al. |
| 9,914,333 B2 * | 3/2018 | Shank ................ B62D 15/0285 |
| 2005/0246081 A1 | 11/2005 | Bonnet et al. |
| 2015/0115571 A1 | 4/2015 | Zhang et al. |
| 2016/0023601 A1 | 1/2016 | Windeler |
| 2016/0272024 A1 | 9/2016 | Bochenek et al. |
| 2016/0375831 A1 * | 12/2016 | Wang ................ B62D 15/0295 |
| | | 348/148 |
| 2017/0043807 A1 | 2/2017 | Shepard |
| 2017/0158007 A1 | 6/2017 | Lavoie |
| 2017/0174130 A1 * | 6/2017 | Hu ........................... B60D 1/06 |
| 2018/0251153 A1 | 9/2018 | Li et al. |
| 2018/0253608 A1 | 9/2018 | Diessner et al. |
| 2018/0319438 A1 | 11/2018 | Herzog |
| 2020/0101897 A1 * | 4/2020 | Miller .................... B60Q 9/008 |

\* cited by examiner

TRAILER HITCHING ASSISTANCE SYSTEM WITH CONTACT MITIGATION MEASURES

FIELD OF THE INVENTION

The present invention generally relates to a vehicle hitch assistance system. In particular, the system implements various measures to mitigate the chance of contact between the vehicle and trailer due to hitch ball overshoot.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a vehicle powertrain control system, a vehicle brake system, a vehicle human-machine interface, an imaging system outputting a signal including scene data of an area to a rear of the vehicle, and a controller. The controller receives the scene data and identifying the trailer within the area to the rear of the vehicle, derives a backing path to align a hitch ball mounted on the vehicle to a coupler of the trailer, outputting a powertrain control signal to the vehicle powertrain control system, and a brake control signal to the vehicle brake system to maneuver the vehicle, including reversing along the backing path and stopping the vehicle at an endpoint of the path, and outputs a video image to the vehicle human-machine interface including a graphical overlay on the image data. The graphical overlay indicates potential movement of the hitch ball past the coupler and being positioned in the image data between a bumper of the vehicle and the hitch ball.

Embodiments of the first aspect of the invention can include any one or a combination of the following features:
- the controller further outputs a steering signal to the vehicle steering system to laterally maintain the vehicle on the backing path during reversing thereon;
- the video image further includes an indication for the user to stop the vehicle if the coupler of the trailer moves into the graphical overlay within the video image;
- the imaging system includes a camera mounted on a rear of the vehicle and capturing at least a portion of the area to the rear of the vehicle included in the scene data;
- the camera is mounted in a fixed position on the vehicle with respect to the bumper, and the graphical overlay is presented in a static position on the video image determined to correspond with the fixed position of the camera with respect to the bumper;
- when the vehicle is at a point along the backing path that is above a threshold distance from the trailer, the controller outputs the image data from a first point of view directed outward from the rear of the vehicle and including the trailer, and when the vehicle is at a point along the backing path that is below the threshold distance from the trailer, the controller outputs the image data from a second point of view directed downwardly from the rear of the vehicle and including the vehicle bumper and at least the coupler of the trailer;
- when the vehicle is at the point along the backing path that is above a threshold distance from the trailer, the controller further outputs a graphical overlay of a representation of the backing path on the image data from a first point of view and does not present the graphical overlay indicating potential movement of the hitch ball past the coupler, and when the vehicle is at a point along the backing path that is below the threshold distance from the trailer, the controller presents the graphical overlay indicating potential movement of the hitch ball past the coupler;
- wherein the controller only maneuvers the vehicle, including reversing along the path, while a predetermined indication is continuously received from the user and immediately outputs the brake control signal to stop the vehicle if the indication is not received while maneuvering the vehicle; and
- the controller further identifies a location of the coupler within the image data at least within a first threshold distance of the trailer, calculates a tracking confidence level of the location of the coupler, and activates a rear-proximity detection system of the vehicle within a second threshold distance of the trailer and at a tracking confidence below a predetermined level, the rear proximity detection system outputting an audible indication of the vehicle approaching the coupler of the trailer.

According to another aspect of the present disclosure, a system for assisting in aligning a vehicle for hitching with a trailer includes a vehicle powertrain control system, a vehicle brake system, a vehicle rear-proximity detection system outputting an audible indication of the vehicle approaching an object within a detection distance, an imaging system outputting a signal including scene data of an area to a rear of the vehicle, and a controller. The controller receives the scene data and identifying the trailer within the area to the rear of the vehicle, derives a backing path to align a hitch ball mounted on the vehicle to a coupler of the trailer, outputs a powertrain control signal to the vehicle powertrain control system, and a brake control signal to the vehicle brake system to maneuver the vehicle, including reversing along the backing path and stopping the vehicle at an endpoint of the path, identifies a location of the coupler within the image data at an associated tracking confidence level at least within a first threshold distance of the trailer while maneuvering the vehicle, and activates the rear-proximity detection system of the vehicle within a second threshold distance of the trailer and at a tracking confidence below a predetermined level.

According to another aspect of the present disclosure, a system for assisting in aligning a vehicle for hitching with a trailer includes a vehicle powertrain control system, a vehicle brake system, a vehicle human-machine interface, a vehicle rear-proximity detection system outputting an audible indication of the vehicle approaching an object within a detection distance, and an imaging system outputting a signal including scene data of an area to a rear of the vehicle. The system further includes a controller receiving the scene data and identifying the trailer within the area to the rear of the vehicle, deriving a backing path to align a hitch ball mounted on the vehicle to a coupler of the trailer, and outputting a powertrain control signal to the vehicle powertrain control system, and a brake control signal to the vehicle brake system to maneuver the vehicle, including reversing along the backing path and stopping the vehicle at an endpoint of the path. The controller also outputs a video image to the vehicle human-machine interface including a graphical overlay on the image data. The graphical overlay indicates potential movement of the hitch ball past the coupler and is positioned in the image data between a bumper of the vehicle and the hitch ball. The controller also identifies a location of the coupler within the image data at an associate tracking confidence level at least within a first threshold distance of the trailer while maneuvering the vehicle and activates the rear-proximity detection system of the vehicle within a second threshold distance of the trailer and at a tracking confidence below a predetermined level.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
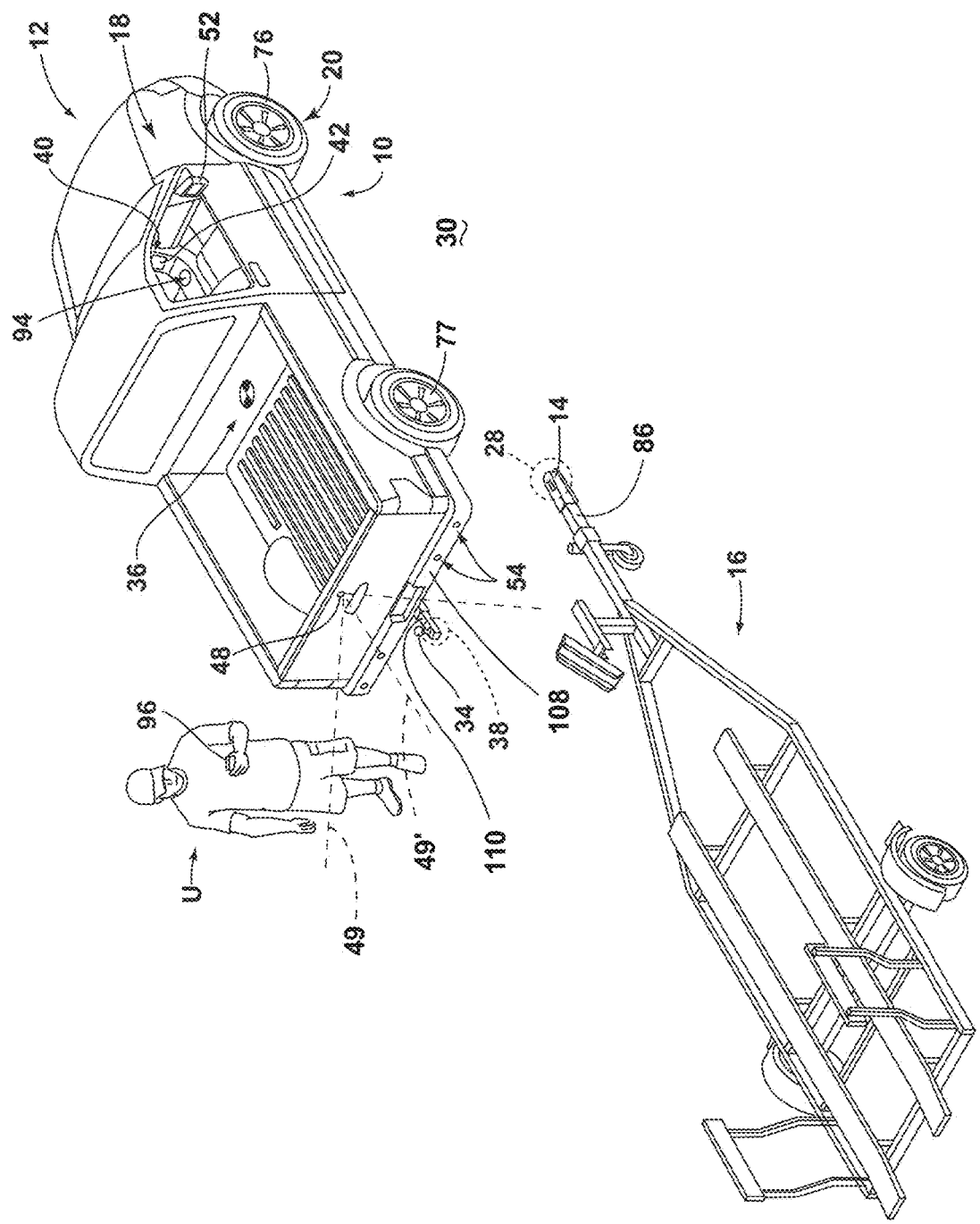
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes-a vehicle powertrain control system, a vehicle brake system, a vehicle human-machine interface, an imaging system outputting a signal including scene data of an area to a rear of the vehicle, and a controller. The controller receives the scene data and identifying the trailer within the area to the rear of the vehicle, derives a backing path to align a hitch ball mounted on the vehicle to a coupler of the trailer, outputting a powertrain control signal to the vehicle powertrain control system, and a brake control signal to the vehicle brake system to maneuver the vehicle, including reversing along the backing path and stopping the vehicle at an endpoint of the path, and outputs a video image to the vehicle human-machine interface including a graphical overlay on the image data. The graphical overlay indicates potential movement of the hitch ball past the coupler and being positioned in the image data between a bumper of the vehicle and the hitch ball.

Figure 2:
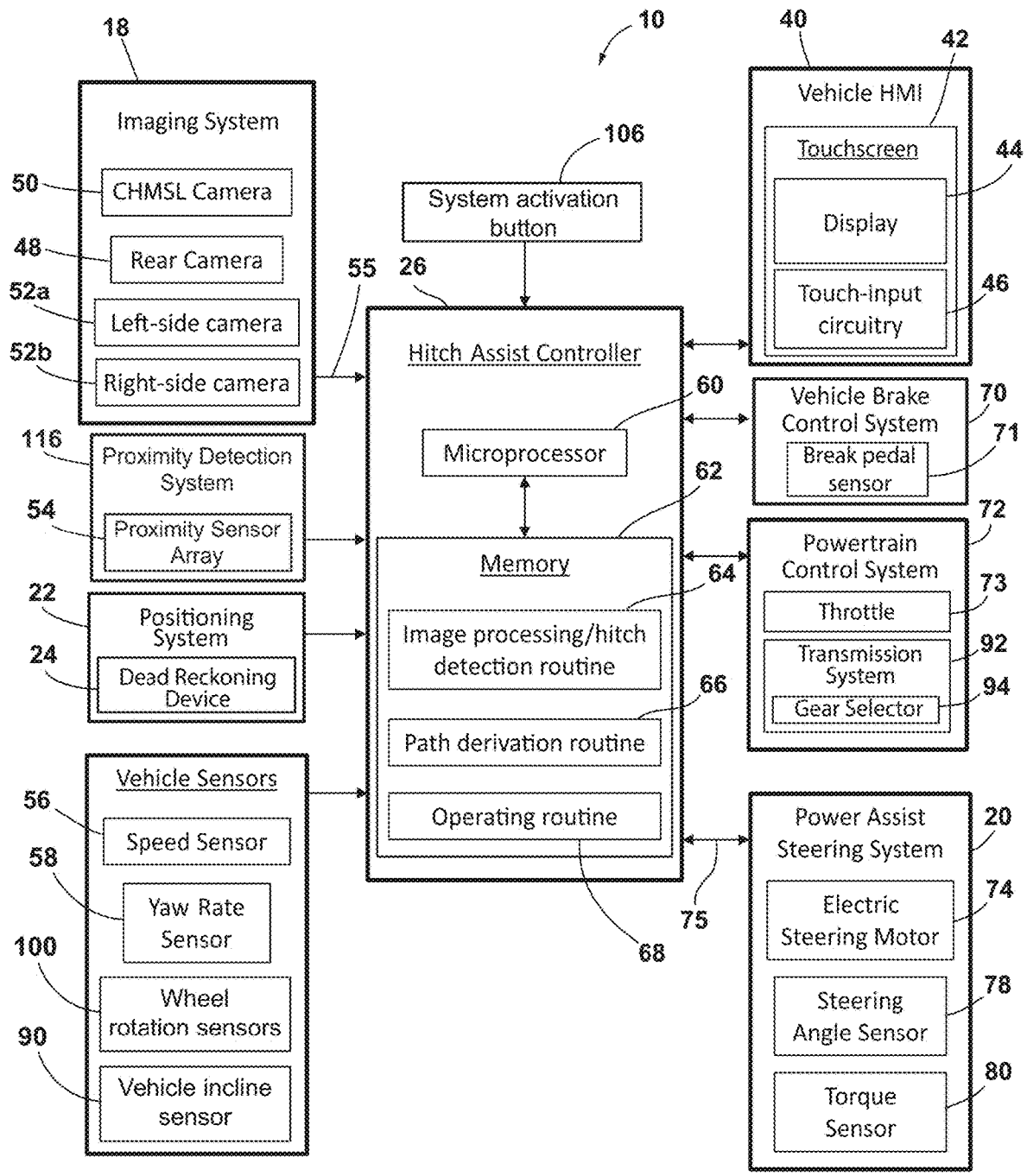
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12, by way of a steering signal 75 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle $\delta$ based on a steering command, whereby the steering angle $\delta$ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
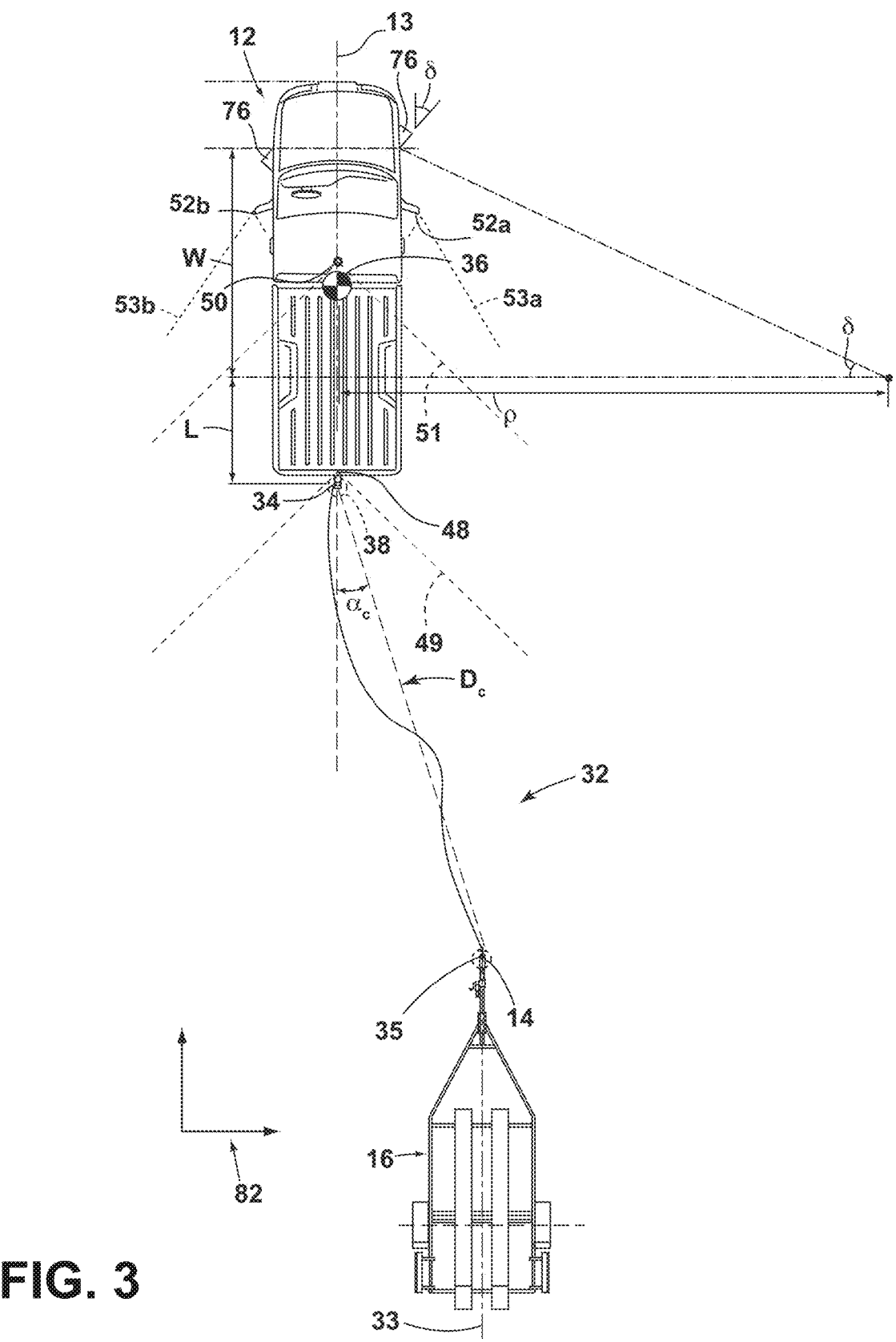
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle $\delta$. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\gamma$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for unintended contact with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated unintended contact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent unintended contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry 46 for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance a to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without unintended contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
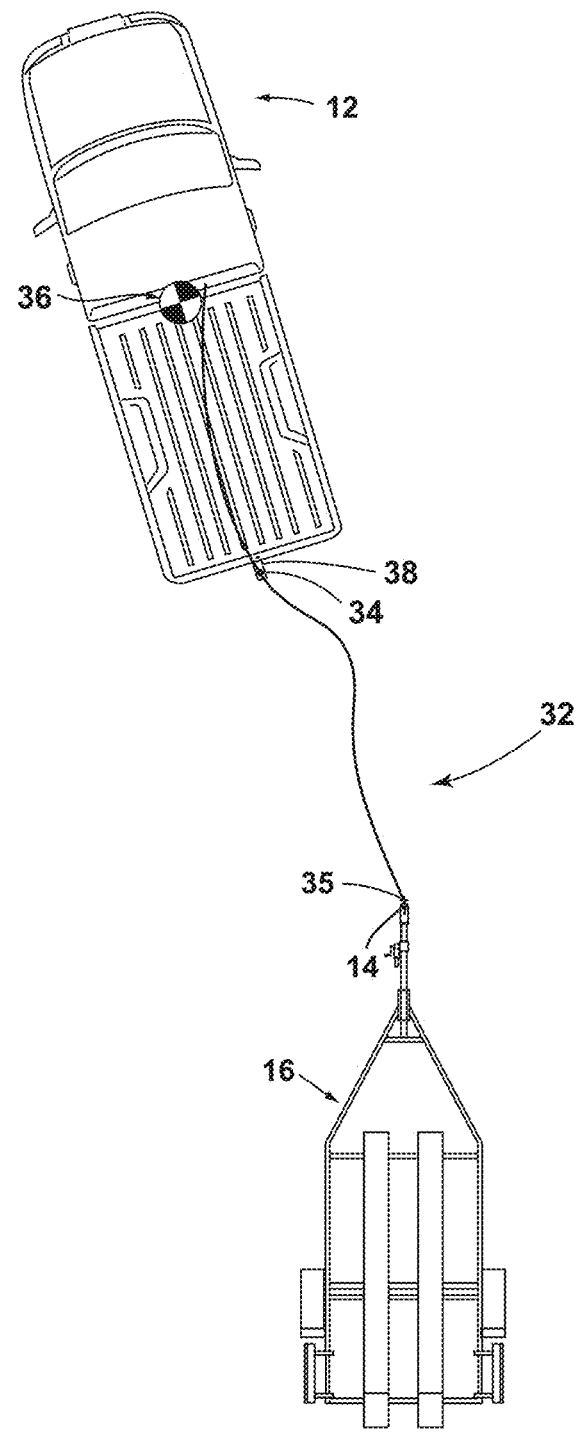
FIG. 4 is an overhead schematic view of the vehicle during a subsequent step of the alignment sequence with the trailer.
Figure 5:
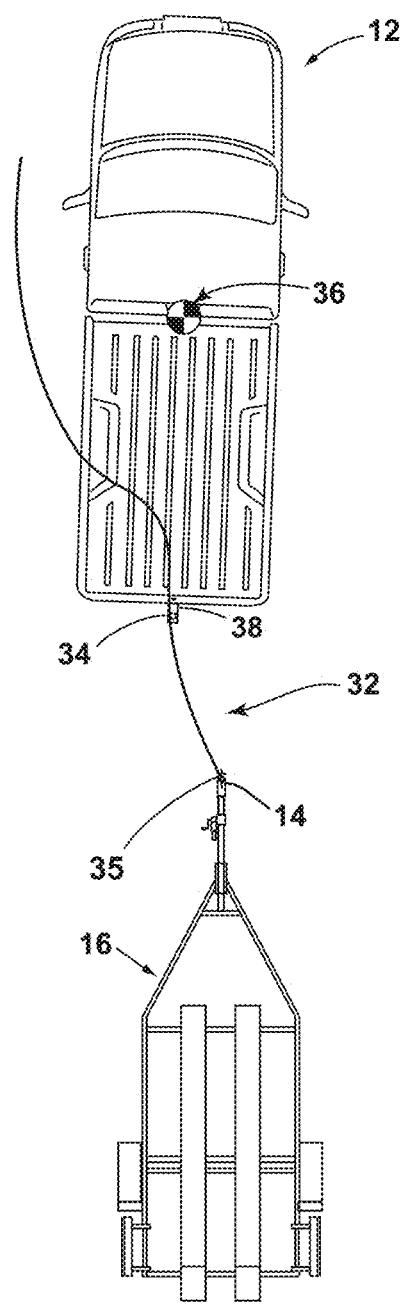
FIG. 5 is an overhead schematic view of the vehicle during a subsequent step of the alignment sequence with the trailer.
Figure 6:
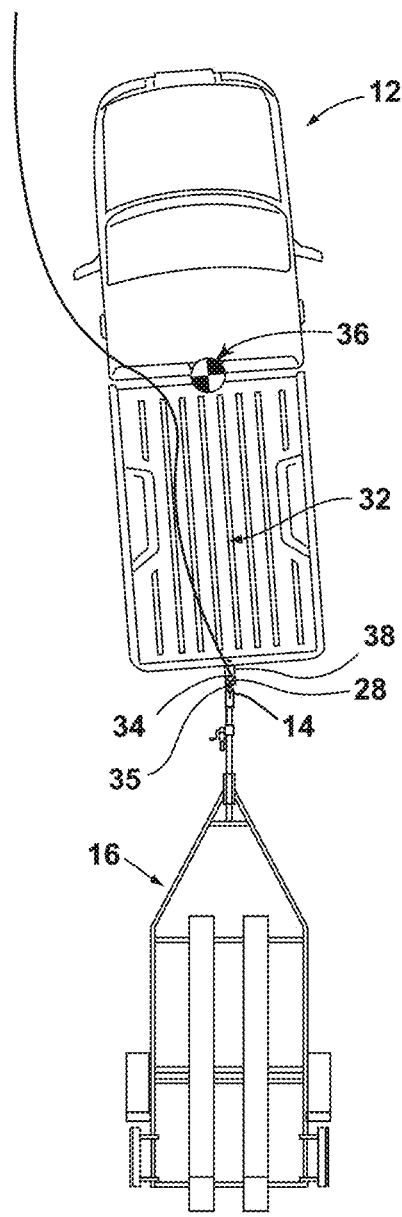
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c,\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38d thereof relative to the tracked position 28 of coupler 14, as discussed above and shown in FIG. 6.

As mentioned above, the "longitudinal control" in an assisted hitching maneuver is the portion of vehicle 12 movement along path 32 controlled by the vehicle powertrain control system 72 and the vehicle brake system 70 with the "lateral control" being the portion controlled by the power assist steering system 20. It is to be understood that the lateral control requires movement of the vehicle such that the two control schemes operate together to move vehicle 12 along the path 32. In this respect, the later alignment of the path 32 with the coupler 14 is dictated by the lateral control (i.e., by the steering system 20) and the final stopping point of vehicle 12 along path 32 is dictated by the longitudinal control. Accordingly, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center). Controller 26 can receive feedback data during vehicle 12 movement regarding measured vehicle speed and localization (by way of speed sensor 56 and positioning system 22, respectively) such that controller 26 can apply brake pressure and reduce engine speed to bring the vehicle 12 to a standstill at the final target position with hitch ball 34 at endpoint 35.

The above-described accuracy with which system 10 can align hitch ball 34 with coupler 14 is dependent on a number of factors that, by not being fully satisfied, can impact the actual alignment accuracy realized in a particular hitching operation. As discussed above, system 10 operates using vision processing of image data 55 by image processing routine 64, and using sensors, such as the ultrasonic sensors in the proximity sensor array 54 to determine the trailer coupler 14 location 28. In certain instances, the accuracy of the image processing routine 64 output and of proximity sensor array 54 may be adversely impacted. Examples of such instances include challenging ambient lighting (too bright or too dim), reflective or rocky ground surface, the presence of weather (rain or snow) or other debris (dirt or dust). Additionally, certain trailers may include features that may be visually similar to the coupler 14 or may reflect light in a way that may cause errors in the output of image processing routine 64. Any of these instances or factors, as well as various combinations thereof, may lead to in accuracies in the detected coupler location 28 that is used to establish the endpoint 35 of path 32 and, accordingly, the ultimate stopping point for vehicle 12. Depending on the level of error in the detected coupler location 28, the corresponding endpoint 35 may be such that the vehicle 12 would be led into contact with trailer 16 (such as at coupler 14). To mitigate the potential for such overshoot and possible resulting contact with trailer 16, the present system 10 implements a number of additional measures that can be presented to the user by system 10 at various instances during automated backing maneuvers because the measures discussed herein can be implemented at various times, they can further be used individually and in various combinations thereof in various implementations of the system 10 described herein. These measures are discussed with general reference to the flowchart depicted in FIG. 7, wherein the measures are depicted within a single method 210 with various steps (such steps being numbered in the 200s, with reference being understood as made with respect to FIG. 7). However, as mentioned above, and discussed below, the individual measures can be implemented separately or in various sub-combinations.

Figure 8:
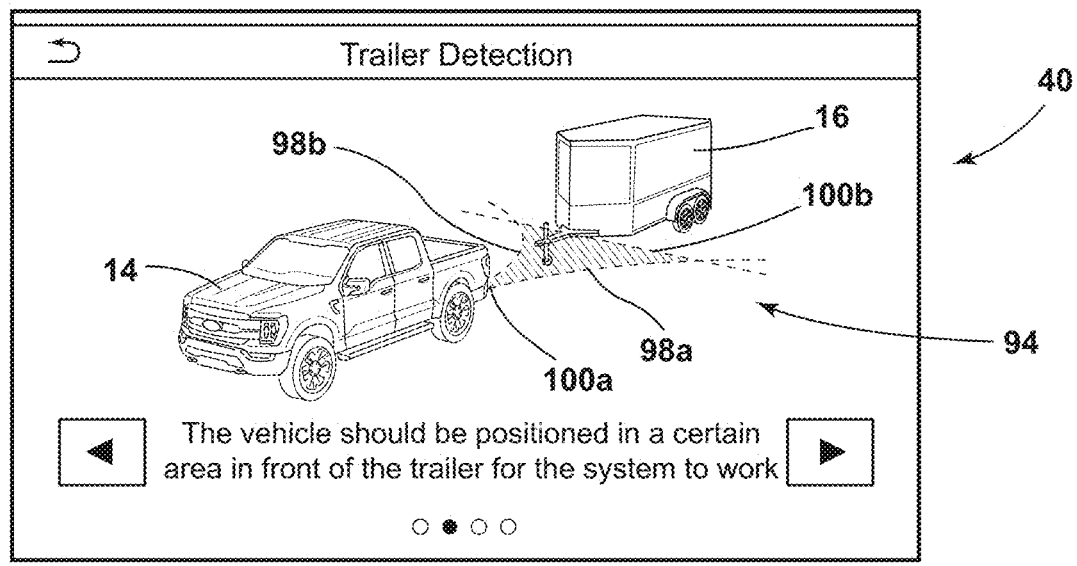
FIG. 8 is a depiction of a graphical image that can be presented by the system to inform a user of various system requirements.

In one aspect, as shown with additional reference to FIG. 8, when system 10 is initially activated (step 212), but before system 10 runs the image processing routine 64 or otherwise takes action to implement an automated backing maneuver (step 214), may present a message 92 on HMI 40 that communicates the general limitation of system 10 in detecting and maneuvering to align hitch ball 34 with coupler 14 (step 216). As illustrated, this can be done in connection with a graphical depiction of vehicle 12 in relation to a target area 94 that communicates lateral positioning limits 98a, 98b based on the steering limits of vehicle 12 that influence the lateral reach of hitch ball 34 by vehicle movement at a maximum permitted steering angle $\delta_{max}$, as well as longitudinal limits 100a, 100b based on limitations of imaging system 18 and/or image processing routine 64, as well as a minimum controllable distance by which system 10 can move vehicle. The determination and use of target area 94 is discussed further in co-pending, commonly-assigned U.S. Pat. No. 11,208,146, the entire disclosure of which is incorporated by reference herein. In a further aspect, a depiction of the target area 94 can be persistently displayed as an overlay on the image data 55 presented on HMI 40, at least during a portion of an automated backing maneuver (including when HMI 40 is not being used for any other of the measures discussed herein. The initial message 92 can also communicate certain environmental conditions helpful for system 10 to operate with the highest possible accuracy, as well as trailer 16 and vehicle 12 characteristics that also allow for maximum system 10 accuracy, including recommending a length range for the drawbar L, as influenced by the length and/or configuration of the ball mount 110 used to couple hitch ball 34 with vehicle 12. Even further, the initial message 94 can also indicate to the user that an overshoot is possible and how it may be identified, as well as actions to be taken by the user to mitigate overshoot, as discussed further below.

According to system 10 operation, the driver is responsible for controlling maneuvering of the vehicle to align the vehicle 12 with respect to trailer 16 such that trailer 16 is in the target area 94. When trailer 16 and/or coupler 14 is present within the target area 94 it may automatically be detected by controller 26 executing image processing routine 64. Upon such detection, an indication can be made to the user that can, further, instruct the user to stop the vehicle 12 and prepare for system 10 to execute the automated hitching maneuver. In one aspect, after the user stops the vehicle 12, system 10 can present a coupler height check message 102 on HMI, as shown in FIG. 8, to communicate to the user the possible need to check the trailer 16 to ensure that trailer tongue 86 is at an appropriate height for the hitch ball 34 to move beneath coupler 14. This message 102 can also request that the user exit vehicle 12 and check for any potential obstructions or the like, which can reduce the likelihood of system 10 interruptions during a subsequent automated backing maneuver.

When the system 10 and user are ready, the user depresses and holds down a system activation button 106 to indicate readiness for automated backing by controller 26 executing operating routine 68. Controller 26 then executes operating routine 68 to reverse vehicle 12 along path 32 toward trailer 16 (step 214), including by controlling the vehicle 12 steering 20, braking 70 and powertrain control 72 systems. System 10 can be configured to require that the system activation button 106 remain depressed to continue automatically backing vehicle 12. In variations, another predetermined indication can be used to initiate and maintain the maneuver. In this manner, if the system activation button 106 is released (step 230), controller 26 can maintain a steering angle δ while ceasing to command application of the vehicle powertrain system 72 and actuating the vehicle brakes by a corresponding signal to the brake control system 70 to bring vehicle to a stop. Controller 26 can then either pause the operation (step 232), to allow the user to resume by again depressing system activation button 106 or can, depending on operational conditions, abort the maneuver. In this manner, the use of the system activation button 106 can provide the driver a quick way to stop autonomous movement of vehicle 12, should the need or desire arise. Additionally, controller 26 can be configured to receive a signal from brake pedal sensor 71 to determine if, during operation, the driver depresses the vehicle brake pedal, which can be interpreted as an indication to pause or abort the automated backing maneuver, with the continued actuation of the brake pedal causing typical application of the vehicle service brakes. As the release of the system activation button 106 may be less disruptive to system 10 operation, allowing an easier resumption of the automated backing maneuver, system 10 can present a message 104 (as shown, for example, in FIG. 10) to keep the button 106 depressed to continue the backing maneuver. Similarly, the use of system activation button 106 to stop vehicle 12 can be communicated in the initial message 94.

Figure 9:
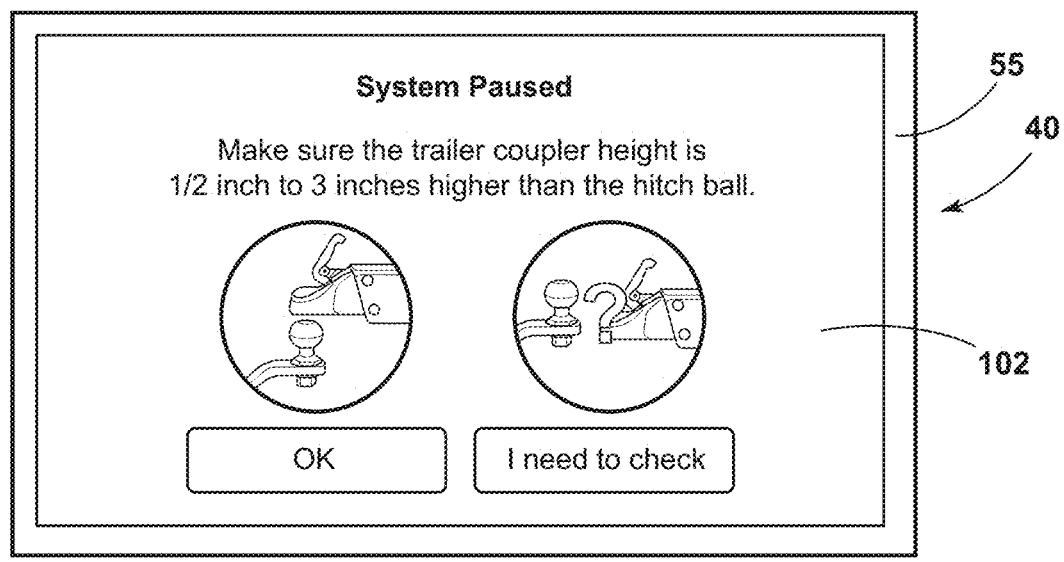
FIG. 9 is a depiction of a further graphical image that the system can present to notify the user of a need to check the trailer coupler height.

Turning to FIG. 9, after system 10 identifies the trailer 16, as discussed above, and during at least an initial portion of the backing maneuver, controller 26 can present a graphical representation of the path 32 on HMI as an overlay on the image data 55 from, for example, rear camera 48 (step 218). The depiction of path 32 can allow the driver to confirm if the path 32 extends to the correct trailer 16 (e.g., if multiple trailers 16 are present), the correct location 28 of the coupler 14, and the like. As the vehicle 12 starts moving under control of system 10, the depicted path 32 is continuously updated to reflect the change in the position of vehicle 12 relative to trailer 16, as well as the continuously-tracked location 28 of coupler, which as discussed above, can change and/or become more refined with decreasing distance $D_c$ between the vehicle 12 and the coupler 14. In this manner, the end 35 of the path 32 can be embellished, such as by including a graphic honing image around the coupler 14, as detected, to indicate to the user the point on the trailer 16 that is detected as the trailer coupler 14. This allows the user to monitor the system 10 identification of coupler 14 and to, potentially, take any necessary action if the coupler 14 is not identified properly, including when vehicle 12 moves to a position closer to trailer 16. The size of the depicted endpoint 35 can also be adjusted to reflect the assessed accuracy or confidence with which image processing routine 64 is able to identify coupler 14.

As further shown in FIG. 9, the initial presentation of the image data 55 on HMI 40 can be made at a perspective directed generally rearward from vehicle 12. Notably, this view is useful in allowing the user to see the trailer 16 and assess whether the vehicle 12 is in the proper position with respect to trailer 16 (including by utilizing the target area 94 overlay discussed above) and that the correct trailer 16 and/or coupler 14 is identified by system 10. Similarly, this viewpoint can allow the path 32 overlay to be assessed by the user during backing of vehicle 12 toward trailer 16. This view can also capture hitch ball 34, which may help give the driver an overall frame of reference and comfort in being able to see the primary subject of alignment with the coupler 14. However, as vehicle 12 moves closer to trailer 16 and the endpoint 35 of path 32, where a closer assessment of vertical alignment between hitch ball 34 and coupler 14 may be beneficial, the perspective of the image, including with the hitch ball and, by that point, the coupler 14 near the bottom of the image, which may be distorted due to the generally wide angle of the field of view 49 of camera 48, may make such an assessment difficult. Accordingly, at a relatively close distance a (step 222) between the vehicle 12 and the trailer 16, controller 26 may cause an adjustment to the portion of the image data 55 displayed on the HMI (step 224).

Figure 10:
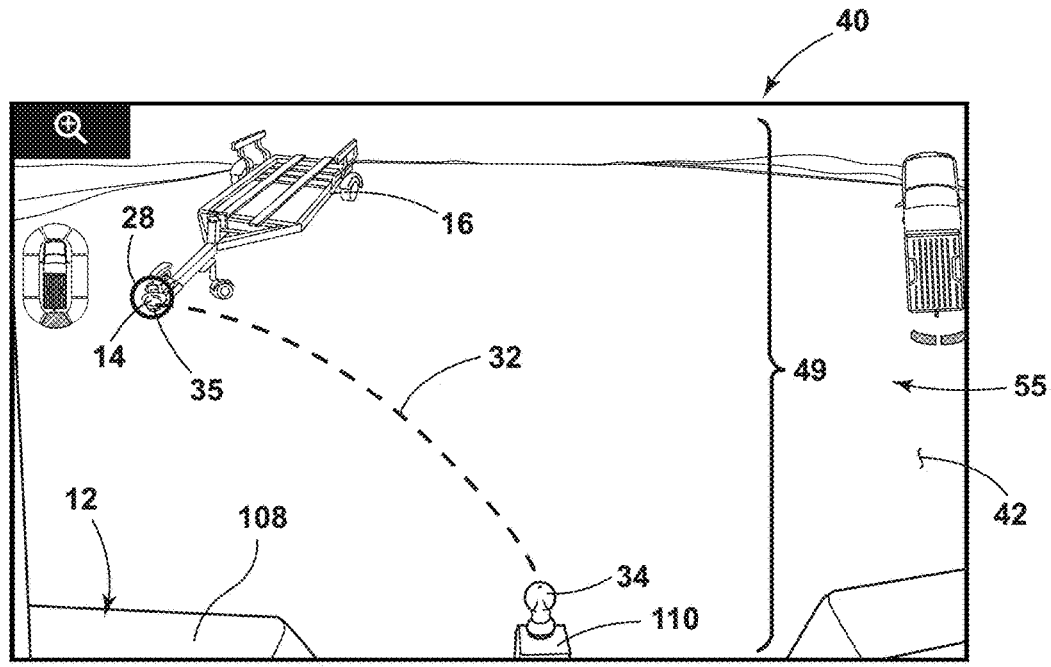
FIG. 10 is a depiction of a display of image data with a projected vehicle path overlaid thereon for presentation on a vehicle human-machine interface.
Figure 11:
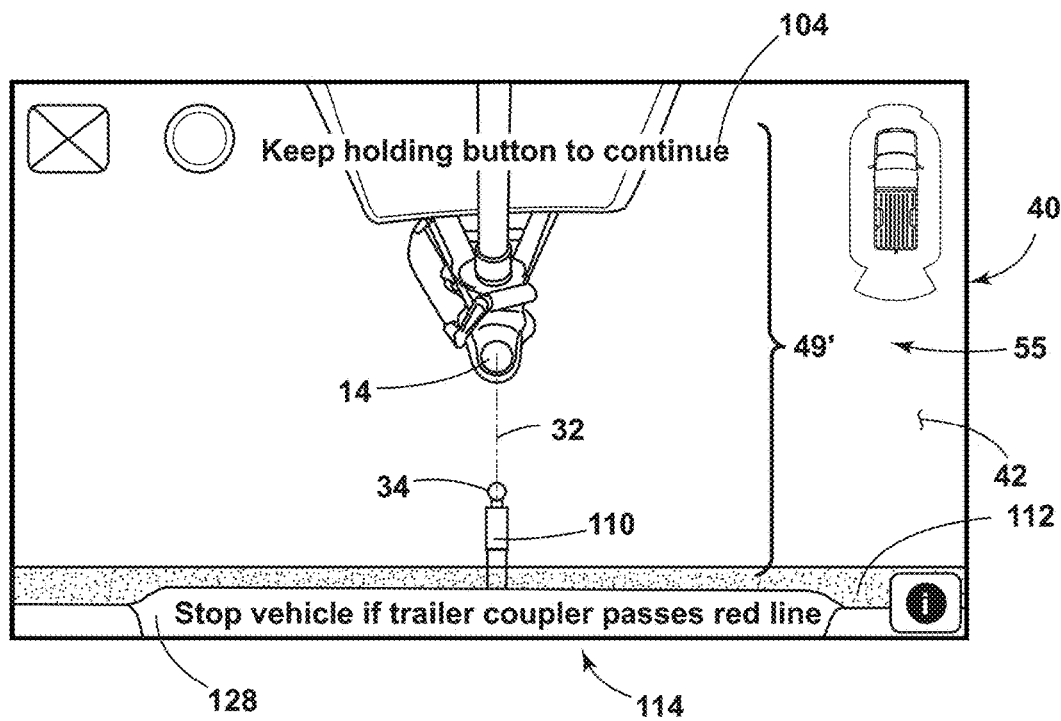
FIG. 11 is a depiction of an alternative display of the image data with additional graphic overlays thereon to allow a user to assess a potential overshoot condition.

As shown in FIG. 10, this adjustment may be made to digitally crop and/or digitally zoom in on a sub-area 49a of the field of view 49 that includes the bumper 108, the ball mount 110, and hitch ball 34, as well as the coupler 14 as it moves toward the hitch ball 34. Such a view can make it easier for the user to visually observe if proper alignment is being achieved, such as by estimating whether the braking commanded by controller 26 is sufficiently slowing the vehicle 12 to stop without hitch ball 34 moving past coupler 14. The usefulness of the adjusted view can be further increased using various image processing techniques, including to compensate for distortion due to the angle of the field of view 49 so that the bumper 108 is shown without distortion, with the ball mount 110 and hitch ball 34 being shown at an accurate position with respect to the bumper 108. Both the digital cropping and zooming, as well as any additional processing can be carried out directly by coupler 14 or can be commanded by coupler 14 to an additional image processor in communication with imaging system 18. In other instances, the camera 48 can be physically moveable such that controller 26 can command downward movement of the camera 48, when desired. The distance $D_c$ at which controller 26 changes the view presented on HMI 40 can correspond with the size of the field of view 49' shown. In particular, because camera 48 is mounted at a fixed distance with respect to bumper 108 (and, accordingly, ball mount 110 and hitch ball 34), the distance from bumper 108 along a theoretical line extending rearward from bumper 108 and horizontally through hitch ball 34 that is captured by the adjusted field of view 49'. Accordingly, the change between the standard view 49 and the adjusted view 49' can take place when the detected coupler 14 location 28 is within the known distance range of the adjusted view 49' (and optionally including a tolerance factor). In various examples, this distance a can be between 1.5 m and 1 m, although variations are possible.

As can be appreciated, the adjusted, top-down field of view 49' shown in FIG. 10 can be useful on its own for making assessments of the accuracy of alignment, including longitudinal alignment, between hitch ball 34 and coupler 14. The ability of a user to assess whether an overshoot has occurred and, more particularly, has occurred to the extent that user intervention (through releasing button 106 or depressing the brake pedal) is desired, can be further augmented by the addition of the illustrated graphical overlay 112 (step 226). As further shown in FIG. 10, the overshoot overlay 112 can be presented as a line or thin rectangular area spaced or extending from the location in the image data 55 corresponding to the outer edge of the bumper 108. In the illustrated embodiment, the overshoot overlay is depicted as a rectangular area with transparent coloring (e.g., red) that can indicate that the user should intervene to prevent overshoot of the coupler 14 from brining coupler into contact with the vehicle 12 including, but not limited to, the bumper 108, by the movement of the coupler 14 into the area occupied by the overshoot overlay 112. In this manner, the distance by which the overshoot overlay 112 extends from bumper 108 (or at which a single line is spaced from the bumper 108) can be configured to allow the user appropriate time to react to the overshoot condition (such as by releasing button 106) and for system 10 to receive the lack of input from button 106 and to stop the vehicle 12. In a further aspect, the allowance for reaction and stopping time can be balanced with the desire to avoid stopping after a slight overshoot in implementations of system 10 that may be able to make adjusting maneuvers after that can correct an overshoot when the vehicle stops autonomously at an inaccurate endpoint 35 that does not result in a contact between coupler 14 and vehicle 12. This functionality is discussed further in co-pending, commonly-assigned U.S. patent application Ser. No. [FOR025 P2382]. The calibration of the overshoot overlay 112 distance from bumper 108 can, accordingly, be made specific to the vehicle 12 and the various system 10 components in a given implementation. In one aspect, the overshoot overlay 112 can be sized to account for the hitch ball 34 location, as well as vehicle 12 powertrain 72 and brake 70 characteristics (including the vehicle power, vehicle weight, and brake configuration), as well as the known or estimated responsiveness of controller 26 in receiving and processing commands. To help the user understand and be aware of the purpose of the overshoot overlay 112, the controller 26 can present a corresponding message 114 over the image data 55 on HMI 40 indicating that the user should stop system 10 operation if the coupler moves into the overshoot overlay 112 area (step 228). Notably, during this stage of operation, the maneuver is most likely to reach the intended alignment of hitch ball 34 with coupler 14, as intended, or at least without overshooting to a point where the user is likely to intervene, at which point the maneuver, automatically ends (step 234).

Because, as discussed above, the location of camera 48 is fixed with respect to the bumper 108, the overshoot overlay 112, when appropriately calibrated, can be presented in a static, fixed position on the video image 55 that is predetermined to correspond with the fixed position of the camera 48 with respect to the bumper 108. This can allow for appropriate sizing and positioning of the overshoot overlay 112 without additional vision processing, for example. In operation, when vehicle 12 is at any point along the backing path 32 that is above the "threshold" distance a (e.g., 1 m to 1.5 m) from the trailer 16 (including the coupler 14), the controller 26 outputs (or otherwise causes to be displayed on HMI 40) the image data 55 from the above-described first point of view directed outward from the rear of the vehicle 12 and including the trailer 16. Again, this can be accompanied by the output of the graphical overlay of the representation of the backing path 32 on the image data 55 and can exclude the overshoot overlay 112. When vehicle 12 moves to a point along the backing path 32 that is below the threshold distance $D_c$ from the trailer 16, the controller 26 outputs or (otherwise causes to be displayed) the image data 55 from the second point of view (i.e. the limited and/or adjusted field of view 49') directed downwardly from the rear of the vehicle 12 and including the vehicle bumper 108 and at least the coupler 14 of the trailer 16. When the transition to the adjusted field of view 49' is made, the controller 26 can also present the overshoot overlay 112 and the accompanying instructional message 114.

In a further aspect of system 10, the controller 26 can be configured to disable or suppress audible notifications made by vehicle 12 in connection with close objects detected by the proximity detection system 116 (an "indication function") (step 236). This is done because, under normal system 10 operation, the coupler 14 moves within a detection threshold distance that would result in the generally known escalating sequence of chimes or tones that proximity detection systems 116 use to indicate the presence and general distance of an object from the rear of a vehicle as it reverses. Because the system is intentionally backing to move the vehicle into a close distance (e.g., less than 1' and, in many instances, less than 6"), the proximity indicating chimes have been determined to be unnecessary or potentially confusing. Accordingly, when controller 26 begins an automated reversing maneuver, it disables the chimes (that may be within additional functionality of controller 26) or signals the proximity detection system 116 to disable the associated chimes (which may be implemented as a portion of the proximity detection system, directly 116). In situations where system 10 determines that overshoot may occur, the controller 26 can re-activate the chimes/audible indications of proximity detection system 116 (step 238) such that the proximity of vehicle to coupler 14 will cause the audible indication of proximity detection system 116 to be activated. This can give the user an indication that an overshoot is possible and to monitor the status of the hitching operation on the HMI 40 for possible intervention (step 230). In one aspect, system 10 can determine that a potential overshoot condition is present by leveraging functionality of image processing routine 64.

The decision by system 10 to reactivate the indication function (chimes) of proximity detection system 116 back on can be made using a tracking uncertainty or confidence level output by image processing routine 64 that is associated with the identification of coupler 14 and determination of its associated location 28 (step 240). In a further aspect, the use of the confidence level can be used in an algorithm that also considers any non-agreement in an indicated or potential coupler 14 location 28 from multiple tracking sources and sensors, including but not limited to the image processing routine 64, proximity sensor array 54 and vehicle radar detectors. This determination can be made only within a threshold distance $D_c$ of coupler 14, particularly wherein accurate tracking is generally more expected (as tracking at far distances with lower confidence is accepted by system 10). In one aspect, this threshold distance can correspond with the image transition threshold discussed above.

Figure 7:
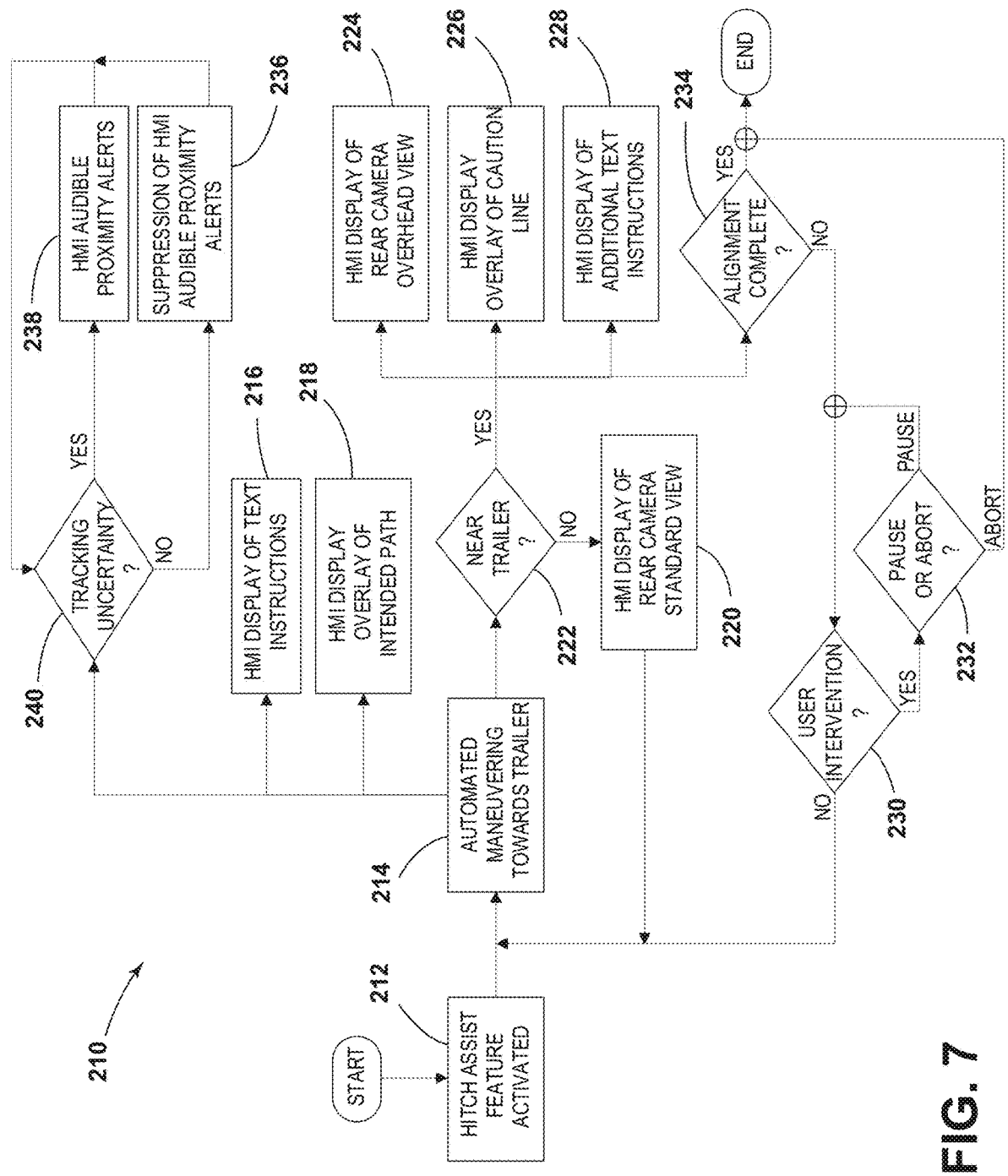
FIG. 7 is a flowchart depicting steps in an automated trailer hitching sequence including various measures that can be taken by the system in mitigating the chance that a target position overshoot leads to the vehicle contacting the trailer.

In one potential mode of operation, discussed with continued reference to FIG. 7, the controller 26, prior to maneuvering the vehicle, deactivates or suppresses the indication function of the rear-proximity detection system 236 indications. During the automated backing maneuver, controller 26 can initially identify trailer 16 and begin backing without identifying coupler 14. Within a first threshold distance, the controller 26 can identify (by system capability or by an initial attempt) the location 28 of the coupler 14 within the image data 55. In connection with the identification of coupler 14, controller 26 can calculate the tracking confidence level of the location 28 of the coupler 14. Controller 26 can continue to track coupler 14 and assess the confidence level 28 of the identification and location 28 as it continues to back toward trailer 16 and can activate the indication function and, accordingly, the chimes associated with rear-proximity detection system 116 within the abovementioned second threshold distance of the trailer if the tracking confidence is below a predetermined level. In this manner, the rear proximity detection system 116 will output the audible indication of the vehicle 12 approaching the coupler 14 of the trailer 16. The rear proximity detection system 116, accordingly, outputs the audible indication of the vehicle 12 approaching the coupler 14 of the trailer 16 when the coupler 14 is within the detection distance. Alternatively, the controller 26, while maneuvering the vehicle 12 can deactivate the indication function of the rear-proximity system 116 within a third threshold distance that is greater than the second (image transition) threshold distance, if the tracking confidence level is above the predetermined threshold. The remaining portions of the backing maneuver can continue as discussed above, including with additional reference to FIG. 7 or as otherwise discussed herein.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   a vehicle powertrain control system;
   a vehicle brake system;
   a vehicle human-machine interface;
   an imaging system outputting a signal including scene data of an area to a rear of the vehicle; and
   a controller:
      receiving the scene data and identifying the trailer within the area to the rear of the vehicle;
      deriving a backing path to align a hitch ball mounted on the vehicle to a coupler of the trailer;
      outputting a powertrain control signal to the vehicle powertrain control system, and a brake control signal to the vehicle brake system to maneuver the vehicle, including reversing along the backing path and stopping the vehicle at an endpoint of the path; and
      outputting a video image to the vehicle human-machine interface including a graphical overlay on the image data corresponding with an area of movement of the hitch ball past the coupler and being positioned in the image data between a bumper of the vehicle and the hitch ball.

2. The system of claim 1, further including a vehicle steering system, wherein:
   the controller further outputs a steering signal to the vehicle steering system to laterally maintain the vehicle on the backing path during reversing thereon.

3. The system of claim 1, wherein the video image further includes an indication for a user to stop the vehicle if the coupler of the trailer moves into the graphical overlay within the video image.

4. The system of claim 1, wherein the imaging system includes a camera mounted on a rear of the vehicle and capturing at least a portion of the area to the rear of the vehicle included in the scene data.

5. The system of claim 4, wherein:
   the camera is mounted in a fixed position on the vehicle with respect to the bumper; and
   the graphical overlay is presented in a static position on the video image determined to correspond with the fixed position of the camera with respect to the bumper.

6. The system of claim 4, wherein:
   when the vehicle is at a point along the backing path that is above a threshold distance from the trailer, the controller outputs the image data from a first point of view directed outward from the rear of the vehicle and including the trailer; and
   when the vehicle is at the point along the backing path that is below the threshold distance from the trailer, the controller outputs the image data from a second point of view directed downwardly from the rear of the vehicle and including the vehicle bumper and at least the coupler of the trailer.

7. The system of claim 6, wherein:
   when the vehicle is at the point along the backing path that is above the threshold distance from the trailer, the controller further outputs a graphical overlay of a representation of the backing path on the image data from a first point of view and does not present the graphical overlay indicating potential movement of the hitch ball past the coupler; and when the vehicle is at the point along the backing path that is below the threshold distance from the trailer, the controller presents the graphical corresponding with the area of movement of the hitch ball past the coupler.

8. The system of claim 1, wherein the controller:
only maneuvers the vehicle, including reversing along the path, while a predetermined indication is continuously received from the user; and
immediately outputs the brake control signal to stop the vehicle if the indication is not received while maneuvering the vehicle.

9. The system of claim 1, wherein the controller further:
identifies a location of the coupler within the image data at least within a first threshold distance of the trailer;
calculates a tracking confidence level of the location of the coupler; and
activates an indication function of a rear-proximity detection system of the vehicle within a second threshold distance of the trailer and at a tracking confidence below a predetermined level, a rear proximity detection system outputting an audible indication of the vehicle approaching the coupler of the trailer.

10. A system for assisting in aligning a vehicle for hitching with a trailer, comprising:
a vehicle powertrain control system;
a vehicle brake system;
a vehicle rear-proximity detection system outputting an audible indication of the vehicle approaching an object within a detection distance;
an imaging system outputting a signal including scene data of an area to a rear of the vehicle; and
a controller:
receiving the scene data and identifying the trailer within the area to the rear of the vehicle;
deriving a backing path to align a hitch ball mounted on the vehicle to a coupler of the trailer;
outputting a powertrain control signal to the vehicle powertrain control system, and a brake control signal to the vehicle brake system to maneuver the vehicle, including reversing along the backing path and stopping the vehicle at an endpoint of the path;
identifying a location of the coupler within the image data at least within a first threshold distance of the trailer while maneuvering the vehicle and calculating a tracking confidence level of the location of the coupler; and
activating an indication function of the rear-proximity detection system of the vehicle within a second threshold distance of the trailer and at a tracking confidence below a predetermined level.

11. The system of claim 10, wherein a rear proximity detection system outputs an audible indication of the vehicle approaching the coupler of the trailer when the coupler is within the detection distance.

12. The system of claim 10, wherein the controller, prior to maneuvering the vehicle, including reversing along the backing path, deactivates the indication function of the rear-proximity detection system.

13. The system of claim 10, wherein the controller, while maneuvering the vehicle deactivates the indication function of the rear-proximity system within a third threshold distance greater than the second threshold distance if the tracking confidence level is above a predetermined threshold.

14. The system of claim 10, further including a vehicle steering system, wherein:
the controller further outputs a steering signal to the vehicle steering system to laterally maintain the vehicle on the backing path during reversing thereon.

15. The system of claim 10, further including a vehicle human-machine interface, wherein the controller further:
outputs a video image to the vehicle human-machine interface including a graphical overlay on the image data corresponding with an area of movement of the hitch ball past the coupler and being positioned in the image data between a bumper of the vehicle and the hitch ball.

16. The system of claim 15, wherein the imaging system includes a camera mounted on a rear of the vehicle and capturing at least a portion of the area to the rear of the vehicle included in the scene data.

17. The system of claim 16, wherein:
when the vehicle is at a point along the backing path that is above the second threshold distance from the trailer, the controller outputs the image data from a first point of view directed outward from the rear of the vehicle and including the trailer; and
when the vehicle is at the point along the backing path that is below the second threshold distance from the trailer, the controller outputs the image data from a second point of view directed downwardly from the rear of the vehicle and including the vehicle bumper and at least the coupler of the trailer.

18. A system for assisting in aligning a vehicle for hitching with a trailer, comprising:
a vehicle powertrain control system;
a vehicle brake system;
a vehicle human-machine interface;
a vehicle rear-proximity detection system outputting an audible indication of the vehicle approaching an object within a detection distance;
an imaging system outputting a signal including scene data of an area to a rear of the vehicle; and
a controller:
receiving the scene data and identifying the trailer within the area to the rear of the vehicle;
deriving a backing path to align a hitch ball mounted on the vehicle to a coupler of the trailer;
outputting a powertrain control signal to the vehicle powertrain control system, and a brake control signal to the vehicle brake system to maneuver the vehicle, including reversing along the backing path and stopping the vehicle at an endpoint of the path; and
outputting a video image to the vehicle human-machine interface including a graphical overlay on the image data corresponding with an area of movement of the hitch ball past the coupler and being positioned in the image data between a bumper of the vehicle and the hitch ball;
identifying a location of the coupler within the image data at least within a first threshold distance of the trailer while maneuvering the vehicle and calculating a tracking confidence level of the location of the coupler; and
activating an indication function of the rear-proximity detection system of the vehicle within a second threshold distance of the trailer and at a tracking confidence below a predetermined level.

19. The system of claim 18, further including a vehicle steering system, wherein:
the controller further outputs a steering signal to the vehicle steering system to laterally maintain the vehicle on the backing path during reversing thereon.

20. The system of claim 18, wherein the controller:
only maneuvers the vehicle, including reversing along the path, while a predetermined indication is continuously received from the user;
and immediately outputs the brake control signal to stop the vehicle if the indication is not received while maneuvering the vehicle.

\* \* \* \* \*